United States Patent [19]

Fitzpatrick et al.

[11] Patent Number: 5,732,711
[45] Date of Patent: Mar. 31, 1998

[54] BODY FUNCTION MEASURING APPARATUS

[75] Inventors: Joseph F. Fitzpatrick, Warminster; Anthony C. Romano, Lansdale; John H. Richards, Warrington, all of Pa.; Ronald S. Kolarovic, Cinnaminson, N.J.

[73] Assignee: Air-Shields, Inc., Hatboro, Pa.

[21] Appl. No.: 703,794

[22] Filed: Aug. 27, 1996

[51] Int. Cl.⁶ .................................... A61B 5/00
[52] U.S. Cl. ............................... 128/736; 128/667
[58] Field of Search ........................ 128/736, 743, 128/633, 664, 665, 666, 667, 690, 798

[56] References Cited

U.S. PATENT DOCUMENTS

| | | |
|---|---|---|
| 2,553,603 | 5/1951 | Peters . |
| 4,295,475 | 10/1981 | Torzala . |
| 4,331,161 | 5/1982 | Patel . |
| 4,399,824 | 8/1983 | Davidson . |
| 5,080,106 | 1/1992 | Sekii et al. . |
| 5,176,704 | 1/1993 | Berndt ............................. 128/736 |
| 5,385,529 | 1/1995 | Koch . |
| 5,392,031 | 2/1995 | Toriumi et al. . |
| 5,415,618 | 5/1995 | Koch . |
| 5,442,157 | 8/1995 | Jackson . |
| 5,450,066 | 9/1995 | Brighenti et al. . |
| 5,452,725 | 9/1995 | Martenson . |
| 5,542,421 | 8/1996 | Erdman ............................ 128/633 |

*Primary Examiner*—Max Hindenburg
*Assistant Examiner*—Pamela Wingood
*Attorney, Agent, or Firm*—Ratner & Prestia

[57] ABSTRACT

Body function measuring apparatus which provides: (1) an indication of the body function being measured, and (2) a loose probe condition by determining that the difference between the rate of change of a first body function signal, developed by a first sensor in the probe, and the rate of change of a second body function signal, developed by a second sensor in the probe, exceeds a predetermined threshold.

8 Claims, 3 Drawing Sheets

BODY FUNCTION MEASURING APPARATUS

TECHNICAL FIELD

The present invention relates, in general, to the measurement of body functions with sensors in contact with the skin of a human being and, in particular, to a unit which, in addition to measuring a body function, provides an indication when the sensor in contact with the skin becomes dislodged from the skin. Although the present invention will be described in connection with skin temperature measurement, it will be apparent that the present invention has broader application.

BACKGROUND OF THE INVENTION

Many probes are in use today to measure or monitor a function of the body with which the probe is in contact or to control or influence a body state or condition. For example, a signal representative of the skin temperature of an infant in an incubator can be used to display the of the infant and can be used to control the incubator heater to regulate the thermal environment of the incubator. In such an application, it is important that intimate contact between the skin and the probe contact surface which carries the temperature sensor be established and maintained. Should the probe become dislodged, resulting in a total or partial loss of contact, the temperature indication will be incorrect and the control of the incubator heater will be other than what is desired, quite possibly leading to dangerous consequences.

Many loose probe indicators have been suggested or put into actual use. Some are based on using the signals representative of the body function being measured to detect a loose probe condition. Others are based on directly measuring some characteristic of the contact, such as impedance, which changes as the contact changes. Yet others incorporate in the probe special sensors, for example optical sensors, which detect changes in the position of the probe relative to the skim Generally, the operation and reliability of the prior art loose probe indicators have not been sufficiently satisfactory.

SUMMARY OF THE INVENTION

Body function measuring apparatus, constructed in accordance with the present invention, includes a housing and first and second identical sensors spaced apart in the housing and adapted for contact with generally the same area of skin for developing first and second body function signals, respectively. This skin temperature measuring apparatus also includes means responsive to the first body function signal and the second body function signal for developing an indication of the body function at the skin with which the first sensor and the second sensor are in contact and detecting a difference between the rate of change of the first body function signal and the rate of change of the second body function signal which exceeds a predetermined threshold representing a difference in the proximity of the first sensor to the skin and the proximity of the second sensor to the skin.

DETAILED DESCRIPTION OF THE INVENTION

Figure 1:
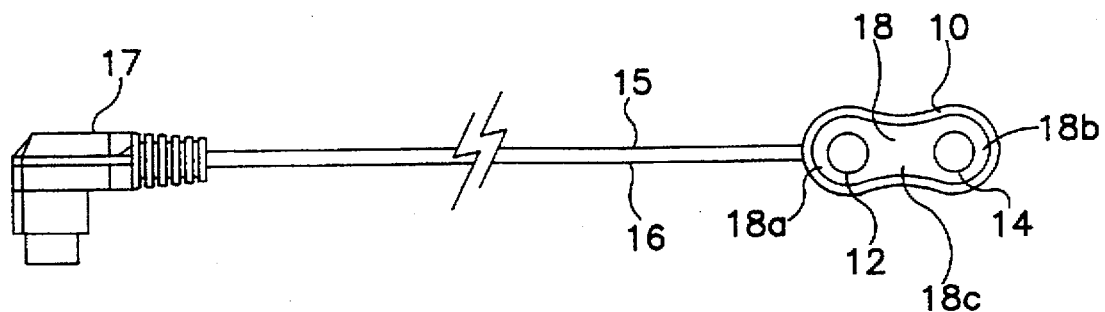
FIG. 1 is a bottom view of the sensor portion of body function measuring apparatus constructed in accordance with the present invention.

Referring to FIG. 1, body function measuring apparatus, constructed in accordance with the present invention, includes a housing 10 and first and second identical sensors 12 and 14 spaced apart in the housing and adapted for contact with generally the same area of skin for developing first and second body function signals, respectively. When the body function measuring apparatus of the present invention is adapted for measuring body temperature, first and second identical sensors 12 and 14 are identical thermistors. The first and second signals developed by sensors 12 and 14, respectively, are conducted by wires 15 and 16 to a connector 17 which is adapted for connection to a unit for displaying a reading of the body function being measured or to control apparatus for controlling the environment of an incubator or both. From this point on, the present invention will be described as applied for skin temperature measurements, although, as indicated above, the present invention has broader application.

Preferably, first thermistor 12 and second thermistor 14 are mounted on a flexible substrate 18 which has first and second lands 18a and 18b on which first thermistor 12 and second thermistor 14, respectively, are mounted. A neck 16e extends between first land 18a and second land 18b and has a width narrower than the width of the first land and the second land.

The flexibility of substrate 18 and its configuration, namely the arrangement of neck 18c extending between first land 18a and second land 18b, enhances the freedom of movement away from the skin of one or the other of thermistors 12 and 14 when the particular thermistor is in partial, rather than full, contact with the skin. A condition of partial contact with the skin of either of the thermistors is likely to lead to incorrect temperature indications. By improving the chances of a partially loose thermistor to move further away from the skin, the relative proximities of the thermistors to the skin will lead to a quicker and more accurate indication of a loose probe condition.

Figure 2:
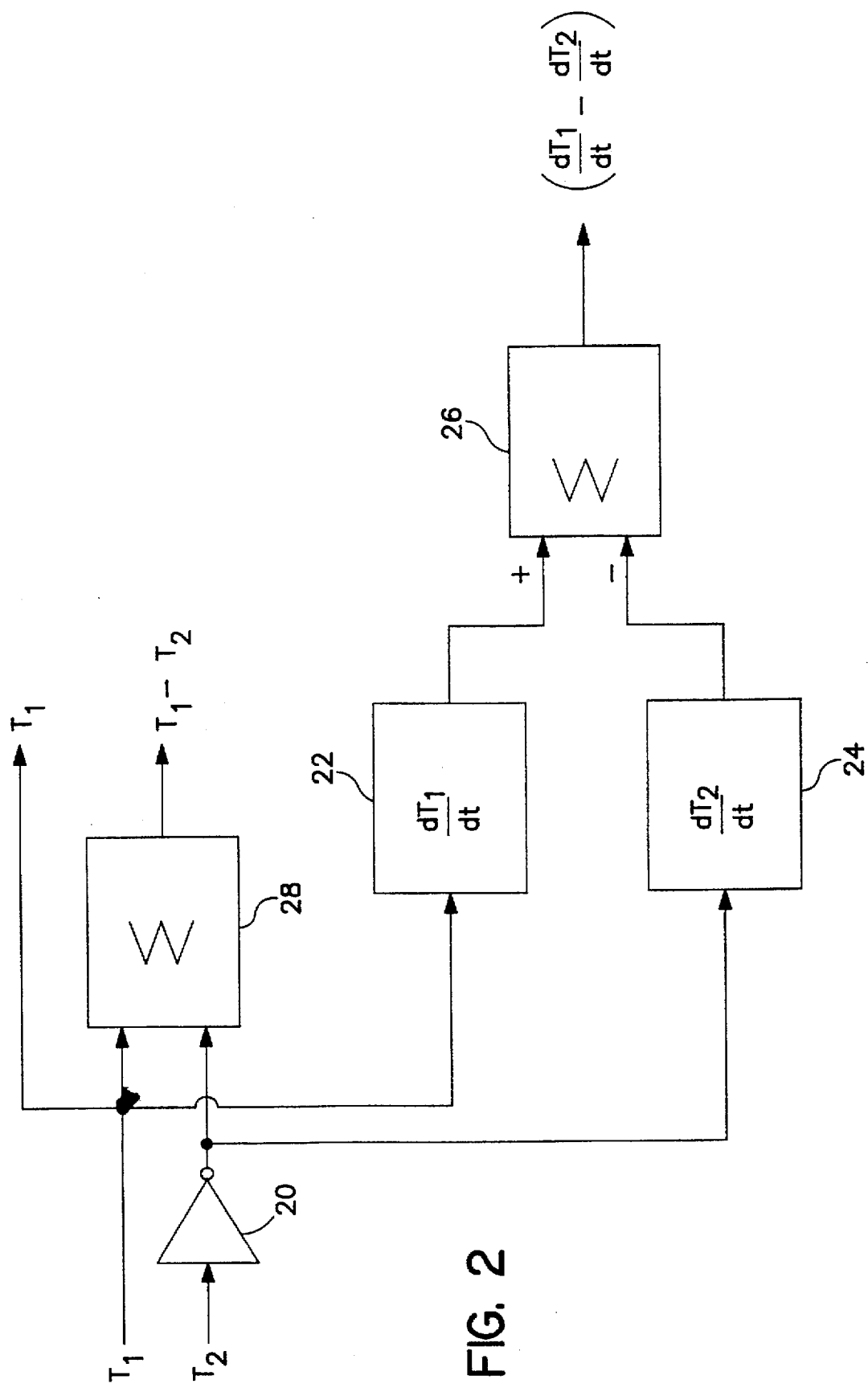
FIG. 2 is a functional block diagram of the signal processing portion of body function measuring apparatus constructed in accordance with the present invention.

Skin temperature measuring apparatus, constructed in accordance with the present invention, also includes means responsive to the first temperature signal developed by thermistor 12 and the second temperature signal developed by thermistor 14 for developing an indication of the temperature of the skin with which the first thermistor and the second thermistor are in contact and detecting a difference between the rate of change of the first temperature signal and the rate of change of the second temperature signal which exceeds a predetermined threshold representing a difference in the proximity of first thermistor 12 to the skin and the proximity of second thermistor 14 to the skin. Referring to FIG. 2, which is a functional block diagram of the signal processing portion of skin temperature measuring apparatus constructed in accordance with the present invention, the first temperature signal $T_1$ is representative of the temperature of the skin with which the first thermistor 12 and the second thermistor 14 are in contact and is provided as one output.

Second temperature signal $T_2$ is inverted by an inverter 20. The first temperature signal $T_1$ and the inverted second temperature signal $T_2$ are differentiated by differentiating circuits 22 and 24, respectively, to develop signals representative of the rate of change of the first temperature signal and the rate of change of the second temperature signal, respectively. The differentiated first temperature signal and the differentiated second temperature signal are combined in a summing circuit 26 to develop, as a second output, a signal representative of the difference between the rate of change of the first temperature signal and the rate of change of the second temperature signal which, if exceeding a predetermined threshold, represents a difference in the proximity of first thermistor 12 to the skin and the proximity of second thermistor 14 to the skin.

Skin temperature measuring apparatus, constructed in accordance with the present invention, preferably also includes means responsive to first temperature signal $T_1$ and second temperature signal $T_2$ for detecting a difference between the first temperature signal and the second temperature signal which exceeds a predetermined threshold representing a failure of one of first thermistor 12 and second thermistor 14. As shown in FIG. 2, the inverted second temperature signal $T_2$ is combined with the first temperature signal $T_1$ in a summing circuit 28 to develop, as a third output, a signal representative of the difference between first temperature signal $T_1$ and second temperature signal $T_2$.

Figure 3:
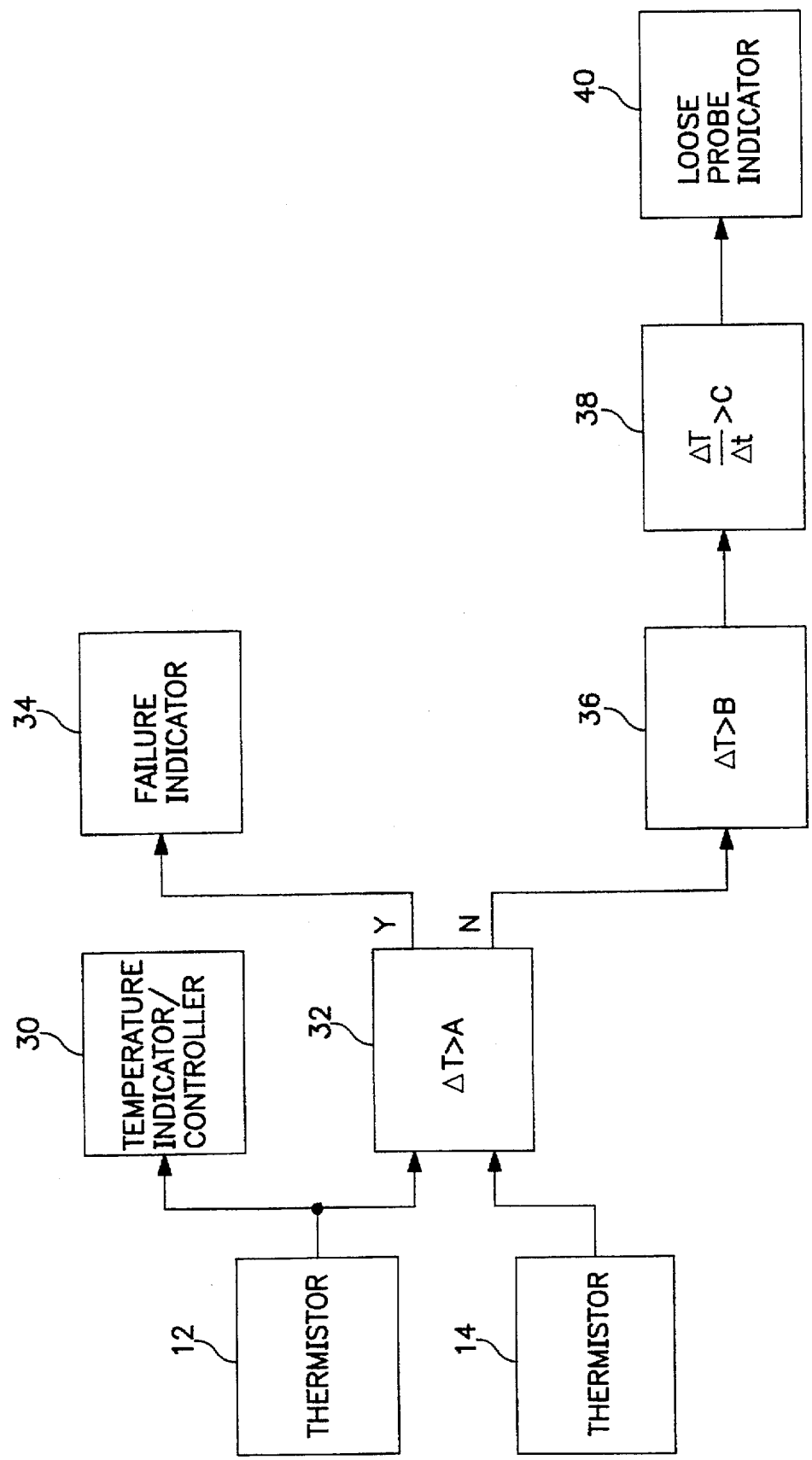
FIG. 3 is a circuit block diagram of the signal processing portion of body function measuring apparatus constructed in accordance with the present invention.

The functions described in connection with FIG. 2 can be implemented by either hardware of software, each of which are represented by the circuit block diagram of FIG. 3. First temperature signal $T_1$, developed by first thermistor 12, is supplied to a temperature indicator/controller 30 which provides a visual indication of the temperature of the skin with which thermistor 12 is in contact and also serves as a control of the temperature of the space within an incubator hood.

First temperature signal $T_1$ and second temperature signal $T_2$, developed by second thermistor 14, are supplied to a differential circuit 32 which develops a signal representative of the difference, if any, between first temperature signal $T_1$ and second temperature signal $T_2$. If there is a and this difference exceeds a first predetermined threshold "A", for example ten degrees, indicative of a failure of either first thermistor 12 or second thermistor 14, an output is developed on a line "Y" and an indication of this difference or failure is provided by a failure indicator 34. If there is a difference between first temperature signal T, and second temperature $T_2$ and this difference is less than the first predetermined threshold "A" but greater than a second predetermined threshold "B", an output is developed on a line "N" and the combination of a level sensing circuit 36 and a differentiating circuit 38 develop a signal representative of the difference between the rate of change of the first temperature signal $T_1$ and the rate of change of the second temperature signal $T_2$ which, if exceeding a predetermined third threshold "C", represents a difference in the proximity of first thermistor 12 to the skin and the proximity of second thermistor 14 to the skin, namely a loose probe condition. The loose probe condition is indicated by a loose probe indicator 40.

It should be noted that, although a loose probe condition produces a difference between in the first temperature signal $T_1$ and the second temperature signal $T_2$, determining the difference between the rate of change of the first temperature signal $T_1$ and the rate of change of the second temperature signal $T_2$ provides a more reliable indication of a loose probe condition. Certain effects, such as thermistors and other sensors wearing over time, produce a difference between the first temperature signal $T_1$ and the second temperature signal $T_2$, so that a difference between the first temperature signal $T_1$ and the second temperature signal $T_2$ is not necessarily due to partial or complete probe dislodgement. Such effects, however, would not produce an appreciable, if any, difference between the rate of change of the first temperature signal $T_1$ and the rate of change of the second temperature signal $T_2$. In contrast, the difference between the first temperature signal $T_1$ and the second temperature signal $T_2$, with a threshold for this difference set sufficiently high, is useful for identifying a failure of of the thermistors which would cause a significant difference between the first temperature signal $T_1$ and the second temperature signal $T_2$.

While there have been described preferred embodiments of the present invention, it should be obvious to those skilled in the art that various modifications and changes can be made without departing from the true spirit and scope of the invention.

What is claimed:

1. Skin temperature measuring apparatus comprising:

a housing;

first and second identical thermistors spaced apart in said housing but in proximity to each other and adapted for contact with generally the same area of skin for developing first and second temperature signals, respectively; and means responsive to said first temperature signal and said second temperature signal for:
  (a) developing an indication of the temperature at the skin with which said first thermistor and said second thermistor are in contact, and
  (b) detecting a difference between the rate of change of said first temperature signal and the rate of change of said second temperature signal which exceeds a predetermined threshold representing a difference in the proximity of said first thermistor to the skin and the proximity of said second thermistor to the skin.

2. Skin temperature measuring apparatus according to claim 1 further including means responsive to said first temperature signal and second temperature signal for detecting a difference between said first temperature signal and said second temperature signal which exceeds a predetermined threshold representing a failure of one of said first thermistor and said second thermistor.

3. Skin temperature measuring apparatus according to claim 3 further including a flexible substrate on which said first thermistor and said second thermistor are mounted.

4. Skin temperature measuring apparatus according to claim 3 wherein said substrate has:
  (a) first and second lands on which said first thermistor and said second thermistor, respectively, are mounted, and
  (b) a neck extending between said first land and said second land and having a width narrower than the width of said first land and said second land.

5. Body function measuring apparatus comprising:

a housing; first and second identical sensors spaced apart in said housing but in proximity to each other and adapted for contact with generally the same area of skin for developing first and second body function signals, respectively; and means responsive to said first body function signal and said second body function signal for:
  (a) developing an indication of the body function at the skin with which said first sensor and said second sensor are in contact, and
  (b) detecting a difference between the rate of change of said first body function signal and the rate of change of said second body function signal which exceeds a predetermined threshold representing a difference in the proximity of said first sensor to the skin and the proximity of said second sensor to the skin.

6. Body function measuring apparatus according to claim 5 further including means responsive to said first body function signal and said second body function signal for detecting a difference between said first body function signal and said second body function signal which exceeds a predetermined threshold representing a failure of one of said first sensor and said second sensor.

7. Body function measuring apparatus according to claim 5 further including a flexible substrate on which said first sensor and said second sensor are mounted.

8. Body function measuring apparatus according to claim 7 wherein said substrate has:

(a) first and second lands on which said first sensor and said second sensor, respectively, are mounted, and (b) a neck extending between said first land and said second land and having a width narrower than the width of said first land and said second land.

* * * * *

UNITED STATES PATENT AND TRADE MARK OFFICE
CERTIFICATE OF CORRECTION

PATENT NO.   : 5,732,711
DATED        : March 31, 1998
INVENTOR(S)  : Joseph F. Fitzpatrick, Anthony C. Romano, John H. Richards, and Ronald S. Kolarovic.

It is certified that error appears in the above-identified patent and that said Letters Patent is hereby corrected as shown below:

Column 4, line 40: delete "3" and insert therefor --1--.

Column 4, line 50: insert a paragraph return after "housing" and begin a new paragraph with the word "first".

Signed and Sealed this

Thirtieth Day of June, 1998

Attest:

BRUCE LEHMAN

Attesting Officer

Commissioner of Patents and Trademarks